(12) United States Patent
Riehl et al.

(10) Patent No.: US 12,334,722 B2
(45) Date of Patent: Jun. 17, 2025

(54) GROUND FAULT CIRCUIT INTERRUPTER (GFCI) DEVICES, SYSTEMS, AND METHODS

(71) Applicant: Schneider Electric USA, Inc., Andover, MA (US)

(72) Inventors: Kenneth Riehl, North Liberty, IA (US); Joseph Hall, Colorado Springs, CO (US); Juan Ignacio Melecio, North Liberty, IA (US); Jeremy D. Schroeder, Cedar Rapids, IA (US); Jacob B. Guelff, Cedar Rapids, IA (US)

(73) Assignee: Schneider Electric USA, Inc., Boston, MA (US)

( * ) Notice: Subject to any disclaimer, the term of this patent is extended or adjusted under 35 U.S.C. 154(b) by 115 days.

(21) Appl. No.: 18/101,060

(22) Filed: Jan. 24, 2023

(65) Prior Publication Data
US 2024/0222954 A1 Jul. 4, 2024

Related U.S. Application Data

(60) Provisional application No. 63/436,436, filed on Dec. 30, 2022.

(51) Int. Cl.
*H02H 3/33* (2006.01)
*H01H 83/14* (2006.01)
*H02H 3/16* (2006.01)

(52) U.S. Cl.
CPC .......... *H02H 3/331* (2013.01); *H01H 83/144* (2013.01)

(58) Field of Classification Search
CPC ................................. H02H 3/331; H02H 3/16
See application file for complete search history.

(56) References Cited

U.S. PATENT DOCUMENTS

| 3,879,639 | A | * | 4/1975 | Sircom | H02H 3/331 |
| | | | | | 361/87 |
| 4,053,815 | A | * | 10/1977 | Sircom | H02H 1/06 |
| | | | | | 361/113 |
| 5,488,303 | A | | 1/1996 | Bagalini | |
| 5,568,344 | A | * | 10/1996 | Gernhardt | H01H 83/04 |
| | | | | | 361/45 |

(Continued)

OTHER PUBLICATIONS

International Search Report and Written Opinion mailed Mar. 22, 2024, issued in corresponding International Patent Application No. PCT/US2023/084603, 15 pages.

*Primary Examiner* — Sisay G Tiku
(74) *Attorney, Agent, or Firm* — Troutman Pepper Locke LLP (57) ABSTRACT

A ground fault circuit interrupter (GFCI) can include a current transformer (CT) comprising a single core, a first winding wound around the single core, and a second winding wound around the single core. The GFCI can include a ground fault (GF) detection module operatively connected to the first winding to receive signals from the first winding and configured to determine whether a line-to-ground fault exists. The GFCI can also include a GN stimulus operatively connected to the second winding to provide a GN stimulus signal to the second winding. The GFCI can also include a grounded neutral (GN) detection module operatively connected to second winding and configured to receive signals from the second winding to determine whether a neutral-to-ground fault exists.

16 Claims, 8 Drawing Sheets

(56) References Cited

U.S. PATENT DOCUMENTS

| | | |
|---|---|---|
| 6,433,977 B1 | 8/2002 | Macbeth |
| 6,556,395 B1* | 4/2003 | Chan ........................ H02H 1/06 |
| | | 361/45 |
| 6,876,528 B2 | 4/2005 | Macbeth |
| 7,684,162 B2 | 3/2010 | Musat et al. |
| 8,599,523 B1 | 12/2013 | Ostrovsky et al. |
| 2005/0231861 A1 | 10/2005 | Power et al. |
| 2010/0073002 A1* | 3/2010 | Chan .................. G01R 31/3272 |
| | | 324/424 |
| 2011/0050292 A1 | 3/2011 | Hui et al. |
| 2011/0222194 A1* | 9/2011 | Kinsel .................... H02H 3/335 |
| | | 324/509 |
| 2013/0279050 A1 | 10/2013 | Kinsel |
| 2018/0100879 A1* | 4/2018 | Jansen ...................... H02H 3/16 |
| 2019/0128941 A1* | 5/2019 | Beck ........................ H02H 3/33 |
| 2019/0363531 A1 | 11/2019 | Ostrovsky |
| 2020/0371166 A1* | 11/2020 | Singh ........................ H02H 7/08 |
| 2024/0222003 A1* | 7/2024 | Riehl .................... H01F 27/027 |

* cited by examiner

GROUND FAULT CIRCUIT INTERRUPTER (GFCI) DEVICES, SYSTEMS, AND METHODS

CROSS-REFERENCE TO RELATED APPLICATIONS

This application claims priority to and the benefit of U.S. Provisional Application No. 63/436,436, filed Dec. 30, 2022, the entire contents of which are herein incorporated by reference in their entirety.

FIELD

This disclosure relates to ground fault circuit interrupters (GFCIs).

BACKGROUND

Traditional ground fault circuit interrupters (GFCIs) with Ground Fault (GF) and Grounded Neutral (GN) detection have circuitry for both GF and GN that utilizes the same analog signal chain and current transformer (CT) sense winding. This requires the control unit to control a field effect transistor (FET) which switches the burden impedance between the two states to detect either GF or GN, but not both simultaneously. Switching the FET may also introduce interference in the signal which makes accurate detection difficult. Additionally, in combination with a set of field conditions this makes for the potential to have breakers unnecessarily trip in the field.

Such conventional methods and systems have generally been considered satisfactory for their intended purpose. However, there is still a need in the art for improved GFCI devices, systems, and methods. The present disclosure provides a solution for this need.

SUMMARY

A ground fault circuit interrupter (GFCI) can include a current transformer (CT) comprising a single core, a first winding wound around the single core, and a second winding wound around the single core. The GFCI can include a ground fault (GF) detection module operatively connected to the first winding to receive signals from the first winding and configured to determine whether a line-to-ground fault exists. The GFCI can also include a GN stimulus operatively connected to the second winding to provide a GN stimulus signal to the second winding. The GFCI can also include a grounded neutral (GN) detection module operatively connected to second winding and configured to receive signals from the second winding to determine whether a neutral-to-ground fault exists. In certain embodiments, the GFCI can include a GF test signal stimulus operatively connected to the second winding to supply a test signal to the second winding when activated such that the test signal is received by the first winding.

In accordance with at least one aspect of this disclosure, a GFCI can include a CT comprising a single core, a GF sense winding wound around the single core, and a test winding wound around the single core. The GFCI can include a GF detection module operatively connected to the GF sense winding to receive signals from the GF sense winding and configured to determine whether a line-to-ground fault exists. The GFCI can also include a test signal stimulus operatively connected to the test winding to supply a test signal to the test winding when activated such that the test signal is coupled onto the GF sense winding via the CT and detected by the GF detection module which receives the signal from the GF sense winding to determine if the CT and GF signal chain is op-erating correctly. The GFCI can also include a GN detection module operatively connected to at least one winding of the current transformer and configured to receive signals from the at least one winding to determine whether a neutral-to-ground fault exists.

In certain embodiments, the at least one winding of the current transformer that is operatively connected to the GN detection module can be the test winding such that the GN detection module is configured to receive signals from the test winding to determine whether a neutral-to-ground fault exists. In certain embodiments, the GFCI can include a GN stimulus operatively connected to the test winding to provide a GN stimulus signal to the test winding. The GN stimulus can be configured to allow the GN detection module to sense changes in impedance to determine whether a neutral-to-ground fault exists.

In certain embodiments, the test signal stimulus and the GN stimulus are commonly hosted. In certain embodiments, the GF detection module and the GN detection module operate simultaneously and/or continuously.

In certain embodiments, the GFCI can include a test detection module operatively connected to the GF sense winding to receive the test signal from the test signal stimulus to test the current transformer and/or a GF signal chain between the current transformer and the GF detection module. In certain embodiments, the test detection module can be configured to receive a test initiation signal associated with the test signal stimulus being activated. In certain embodiments, the GF detection module and the test detection module can be commonly hosted.

In certain embodiments, the current transformer can include a GN winding (e.g., separate from the test winding). In such embodiments, the at least one winding of the current transformer that is operatively connected to the GN detection module is the GN winding.

In accordance with at least one aspect of this disclosure, a GFCI circuit breaker can be similar to and/or include any suitable embodiment and/or portion of a GFCI disclosed hereinabove. The GFCI circuit breaker can include a line wire passing through the single core, and a neutral wire passing through the single core, for example.

In accordance with at least one aspect of this disclosure, a method can include using at least two coils on a single core to provide simultaneous GF monitoring and GN monitoring. In certain embodiments, using the at least two coils can include sensing line-to-ground fault using a GF sense winding and sensing neutral-to-ground fault using a test winding.

In accordance with at least one aspect of this disclosure, a GFCI can include a CT arrangement, comprising one or more cores, a GF sense winding wound around one of the one or more cores, and a test winding wound around one of the one or more cores. The GFCI can include a GF detection module operatively connected to the GF sense winding to receive signals from the GF sense winding and configured to determine whether a line-to-ground fault exists, a test signal stimulus operatively connected to the test winding to supply a test signal to the test winding when activated such that the test signal is coupled onto the GF sense winding via the CT and detected by the GF detection module which receives the signal from the GF sense winding to determine if the CT and GF signal chain is op-erating correctly, and a GN detection module operatively connected to the test winding and configured to receive signals from the test winding to determine whether a neutral-to-ground fault exists. The GFCI can include a GN stimulus operatively connected to the test winding to provide a GN stimulus signal to the test winding. The GFCI can include any other components, e.g., as disclosed hereinabove, and/or can be similar to other embodiments of GFCIs disclosed herein. Any suitable number of cores (e.g., one, more than one) are contemplated herein (e.g., such that the GFCI includes any suitable number of CTs, e.g., one, two).

In accordance with at least one aspect of this disclosure, a GFCI circuit breaker can be or include the GFCI as disclosed above. The GFCI circuit breaker can include a line wire passing through the one or more cores, and a neutral wire passing through the one or more cores. In accordance with at least one aspect of this disclosure, a method can include using a GF sense winding to provide GF monitoring to detect a line-to-ground fault, and using a test coil for testing GF monitoring function and to provide GN monitoring to detect a neutral-to-ground fault. In certain embodiments, GN monitoring and GF monitoring are simultaneous. The GFCI circuit breaker can be similar to and/or include any suitable embodiment and/or portion of a GFCI disclosed hereinabove.

In accordance with at least one aspect of this disclosure, a GFCI can include a first current transformer CT having a first core, which can be a PCB core or an air core, and a GF sense winding wound around the first core (e.g., around the entire circumference). The GFCI can include a second CT having a second core, which can be a ferromagnetic or nanocrystalline core, and a GN sense winding wound around (e.g., partially) the second core. The GFCI can include a GF detection module operatively connected to the GF sense winding to receive signals from the GF sense winding and configured to determine whether a line-to-ground fault exists. The GFCI can include a GN detection module operatively connected to the GN sense winding and configured to receive signals from the GN sense winding to determine whether a neutral-to-ground fault exists.

In certain embodiments, the first current transformer includes a test winding wrapped around the first core. In certain embodiments, the GFCI includes a test signal stimulus operatively connected to the test winding to supply a test signal to the test winding when activated such that the test signal is coupled onto the GF sense winding via the CT and detected by the GF detection module which receives the signal from the GF sense winding to determine if the CT and GF signal chain is op-erating correctly.

In certain embodiments, the GN sense winding is a wound around the second core 20 times. In certain embodiments, the GF sense winding is wound around the entire circumference of the first core.

In certain embodiments, the GN stimulus is configured to allow the GN detection module to sense changes in impedance to determine whether a neutral-to-ground fault exists. In certain embodiments, the GF detection module and the GN detection module operate simultaneously and/or continuously.

In certain embodiments, the first CT can have a coreless planar PCB GF sense winding instead of a core and a winding wound around the core. Any suitable number of planar wounds is contemplated herein.

In accordance with at least one aspect of this disclosure, a GFCI circuit breaker can include a first CT and a second CT as disclosed hereinabove. The GFCI circuit breaker can include a line wire passing through both of the first core and second core, or both of the coreless GF sense winding and the second core. The GFCI circuit breaker can include a neutral wire passing through both of the first core and second core, or both of the coreless GF sense winding and the second core. The GFCI circuit breaker can be similar to and/or include any suitable embodiment and/or portion of a GFCI disclosed hereinabove.

In accordance with at least one aspect of this disclosure, a ground fault circuit interrupter (GFCI) can include a current transformer (CT) having a single core, a first winding wound around the single core, and a test winding wound around the single core. The GFCI can include a ground fault (GF) detection module operatively connected to the first winding to receive signals from the first winding and configured to determine whether a line-to-ground fault exists, a grounded neutral (GN) detection module operatively connected to first winding and configured to receive signals from the first winding to determine whether a neutral-to-ground fault exists, and a FET configured to switch between a GF sense mode and a GN sense mode, and a push-to-test module operatively connected to the test winding to inject test signal onto the single core.

In accordance with at least one aspect of this disclosure, a method can include using a controller to inject a controller signal onto a test winding, receiving the controller signal from a sense winding magnetically coupled to the testing winding via a common core, and detecting the presence of the test signal at a test detection module. The controller can be activated by a push-to-test (PTT) button. The controller signal can have preset characteristics configured to be identified by the test detection module. The controller signal can be a square wave signal.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
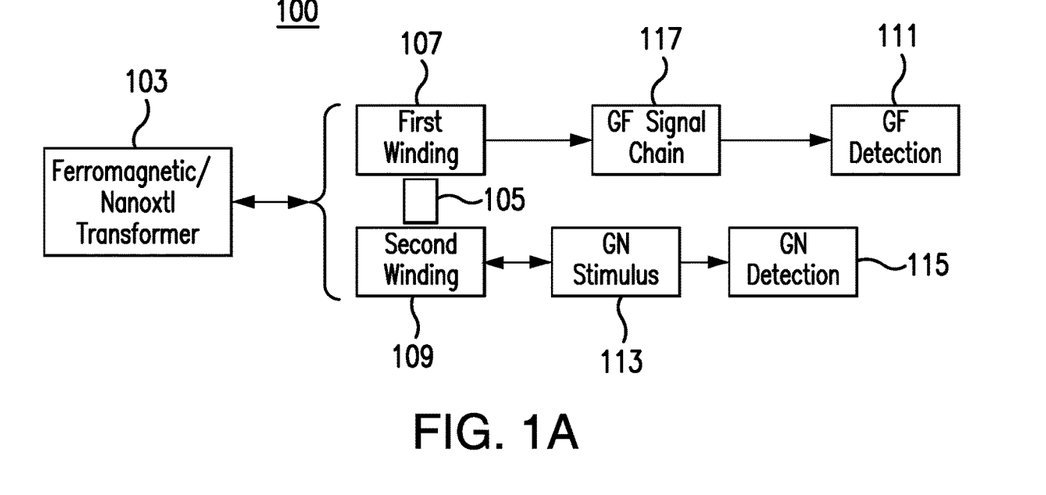
FIG. 1A is a schematic diagram of an embodiment of a ground fault circuit interrupter (GFCI) in accordance with this disclosure.

Reference will now be made to the drawings wherein like reference numerals identify similar structural features or aspects of the subject disclosure. For purposes of explanation and illustration, and not limitation, an illustrative view of an embodiment of a ground fault circuit interrupter (GFCI) in accordance with the disclosure is shown in FIG. 1A and is designated generally by reference character 100. Other embodiments and/or aspects of this disclosure are shown in FIGS. 1B-5B.

Figure 1B:
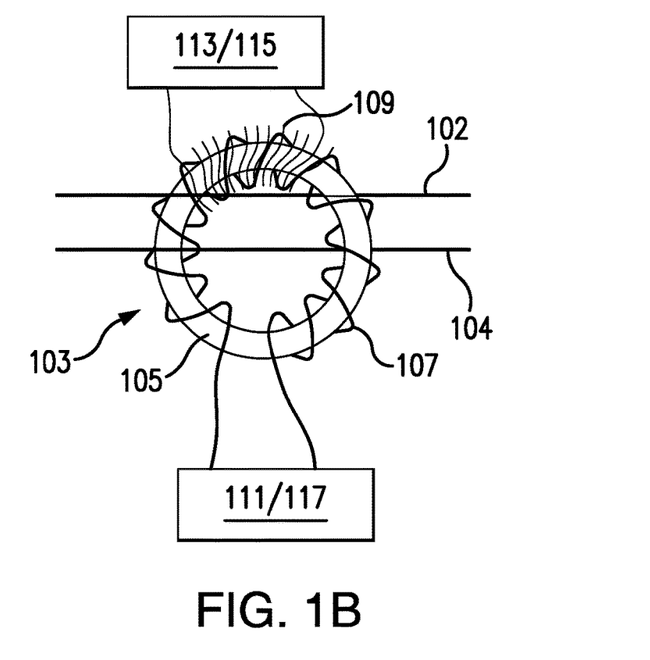
FIG. 1B is a schematic diagram of an embodiment of the GFCI of FIG. 1, shown having a hot line and a neutral line passing through a current transformer (CT)

Referring to FIGS. 1A and 1B, a ground fault circuit interrupter (GFCI) 100 can include a current transformer (CT) 103 comprising a single core 105 (e.g., a toroidal or ring shaped body). The core 105 can be made of a ferromagnetic material and/or a nanocrystalline material, for example.

The CT 103 can include a first winding 107 wound around the single core 105 (e.g., substantially evenly around the entire circumference of the core 105), and a second winding 109 wound around the single core 105 (e.g., around only a portion of the circumference of the core 105). Any other suitable winding amount (e.g., 360 degrees, 90 degrees, etc.) for either winding to perform as desired for a desired application is contemplated herein.

The GFCI 100 can include a ground fault (GF) detection module 111 operatively connected to the first winding 107 to receive signals from the first winding 107 and configured to determine whether a line-to-ground fault exists. For example, the first winding 107 can be configured to output a voltage indicative of a difference in current between a line conductor 102 (e.g., which sends current to the load) and a neutral conductor 104 (e.g., which returns current from the load). When there is no line-to-ground fault, equal and opposite currents in the line conductor 102 and the neutral conductor 104 substantially cancel out the electromagnetic effect, and no voltage or negligible voltage (e.g., due to winding or conductor placement imperfection) is induced on the first winding 107. If there is a line-to-ground fault (e.g., current is travelling from the line conductor 102 to ground), a threshold voltage can be induced on the first winding 107 because current returning on the neutral conductor 104 is less than that of the line conductor 102. Therefore, the GF detection module 111 can be configured to detect whether voltage from the first winding 107 is above a threshold to determine whether there is a ground fault.

The GFCI 100 can also include a GN stimulus 113 operatively connected to the second winding 109 to provide a GN stimulus signal to the second winding 109. The GFCI 100 can also include a grounded neutral (GN) detection module 115 operatively connected to second winding 109 and configured to receive signals from the second winding 109 to determine whether a neutral-to-ground fault exists. For example, the GN stimulus signal can be time-varying and allow the GN detection module 115 to sense an impedance change in the system, for example, which can be indicative of a grounded neutral fault (e.g., when the neutral conductor 104 is grounded, which may not present as a current difference between the line conductor 102 and the neutral conductor 104). In certain embodiments, the GFCI 100 can include a GF test signal stimulus (not shown in FIG. 1A, e.g., stimulus 219 shown in FIG. 2) operatively connected to the second winding 109 to supply a test signal to the second winding 109 when activated such that the test signal is received by the first winding 107. One or more embodiments of a GFCI (e.g., each disclosed herein) as disclosed herein can be configured to simultaneously monitor for GF and GN, and can also provide GF test (e.g., for testing the function of the GFCI and/or any portion of the GF signal chain 117).

Figure 2:
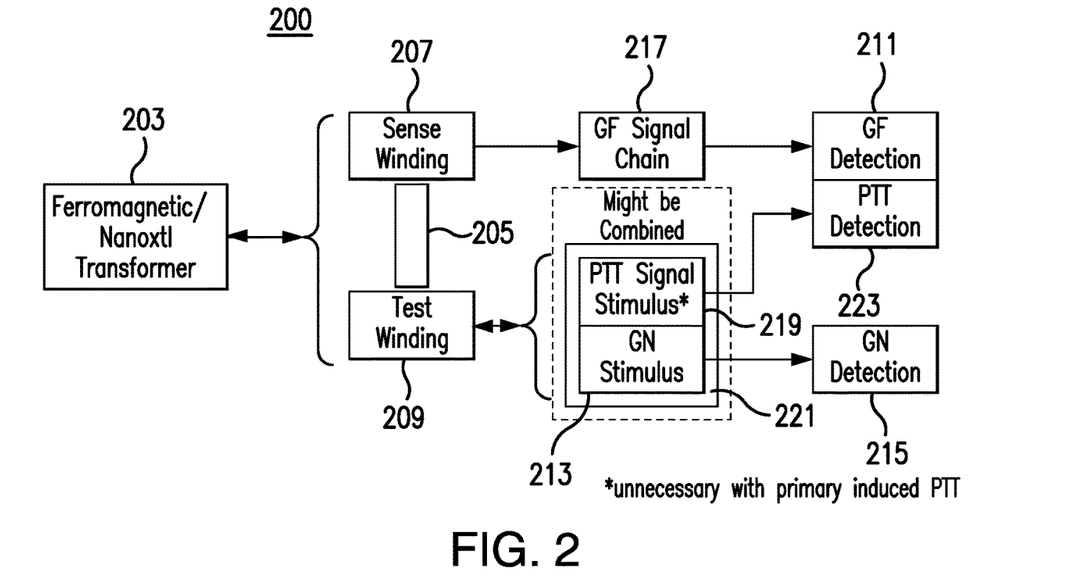
FIG. 2 is a schematic diagram of an embodiment of a GFCI in accordance with this disclosure.

In accordance with at least one aspect of this disclosure, referring to FIG. 2, a GFCI 200 can include a CT 203 (e.g., similar to CT 103) comprising a single core 205 (e.g., similar to core 105 as shown in FIG. 1B). The CT 203 can include a GF sense winding 207 wound around the single core 205 (e.g., similar to the first winding 107). The CT 203 can include a test winding 209 wound around the single core 205 (e.g., similar to the second winding 109). The GFCI 200 can include a GF detection module 211 operatively connected to the GF sense winding 207 (e.g., via a GF signal chain 217) to receive signals from the GF sense winding 207 and configured to determine whether a line-to-ground fault exists (e.g., similar to module 111).

The GFCI 200 can also include a test signal stimulus 219, a push-to-test (PTT) stimulus, operatively connected to the test winding 209 to supply a test signal to the test winding 209 when activated such that the test signal is coupled onto the GF sense winding 207 via the CT 203 and detected by the GF detection module 211 which receives the signal from the GF sense winding 207 to determine if the CT and GF signal chain is operating correctly (e.g., via electromagnetic interaction). For example, the test signal stimulus 219 can be configured to output a test signal having an identifiable characteristic (e.g., amplitude, frequency, etc.) which can be preset and/or controllable in real time.

The GFCI 200 can also include a GN detection module 215 (e.g., similar to module 115) operatively connected to at least one winding (e.g., the test winding 209) of the current transformer 203 and configured to receive signals from the at least one winding (e.g., the test winding 209) to determine whether a neutral-to-ground fault exists. In certain embodiments, the at least one winding of the current transformer 203 that is operatively connected to the GN detection module 215 can be the test winding 209, e.g., as shown in FIG. 2, such that the GN detection module 215 is configured to receive signals from the test winding 209 to determine whether a neutral-to-ground fault exists. In certain embodiments, the GFCI 200 can include a GN stimulus 213 (e.g., similar to GN stimulus 113) operatively connected to the test winding 209 to provide a GN stimulus signal to the test winding 209. The GN stimulus 213 can be configured to allow the GN detection module 215 to sense changes in impedance (e.g., in the conductors 102, 104) to determine whether a neutral-to-ground fault exists.

In certain embodiments, as shown in FIG. 2, the test signal stimulus 219 (e.g., a push-to-test (PTT) stimulus) and the GN stimulus 213 are commonly hosted (e.g., on a single module 221 of hardware and/or software). In certain embodiments, the GN stimulus 213 and the test stimulus 219 can be hosted separately. In certain embodiments, no test signal stimulus 219 is necessary with a primary induced test signal.

In certain embodiments, the GF detection module 211 and the GN detection module 215 operate simultaneously and/or continuously. In this regard the GFCI 200, can always monitor for both GN faults and GF faults without having to utilize and switching hardware and control logic.

In certain embodiments, the GFCI 200 can include a test detection module 223 operatively connected to the GF sense winding 207 to receive the test signal from the test signal stimulus 219 (through the CT 203 and any GF signal chain 217) to test the current transformer 203 and/or a GF signal chain 217 between the current transformer 203 and the GF detection module 211. In certain embodiments, the test detection module 223 can be configured to receive a test initiation signal associated with the test signal stimulus being activated. In certain embodiments, there may be no direct connection between the test detection module 223 and the test signal stimulus 219 (e.g., and the test detection module 223 can be configured to identify one or more prescribed test signals from the test signal stimulus 219). In certain embodiments, the GF detection module 211 and the test detection module 223 can be commonly hosted, e.g., as shown in FIG. 2.

Figure 3:
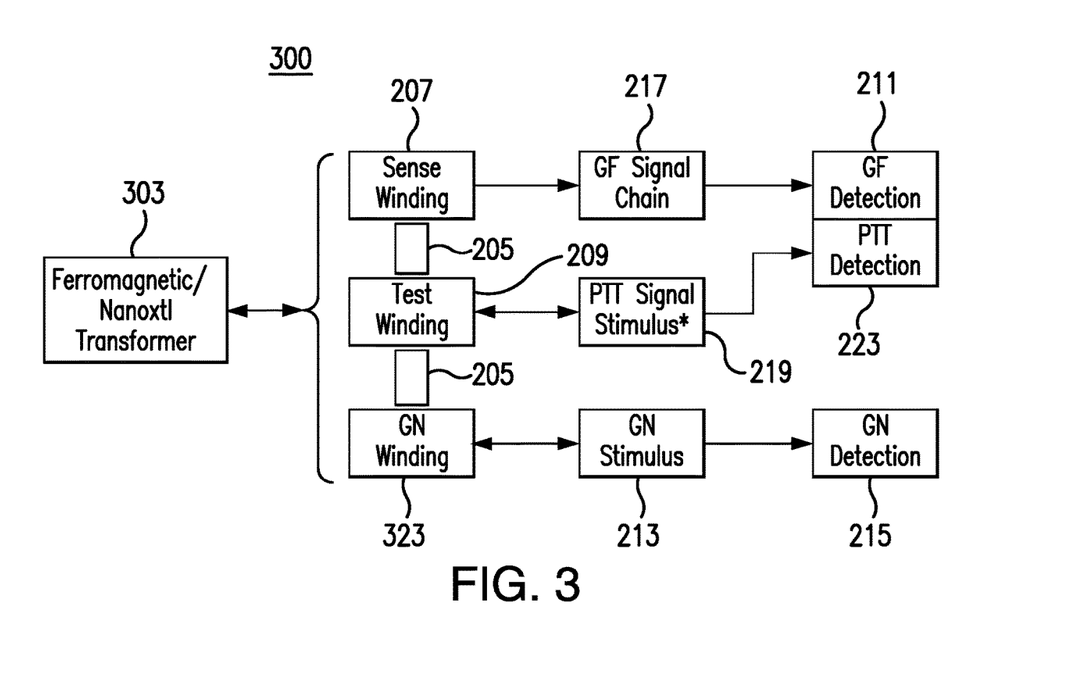
FIG. 3 is a schematic diagram of an embodiment of a GFCI in accordance with this disclosure.

In certain embodiments, referring to FIG. 3, a GFCI 300 can include a current transformer 303. The current transformer 303 can include a GN winding 323 (e.g., separate from the test winding 209), e.g., wound around the single core 205 (e.g., at least partially of the circumference of the core 205). In such embodiments, the at least one winding of the current transformer 303 that is operatively connected to the GN detection module 215 is the GN winding 323. In this regard, each function can have independent pathways. As shown, in certain embodiments, the test signal stimulus 219 can be separated from the GN stimulus 213. The GFCI 300 can be otherwise similar to the GFCI 200 disclosed herein.

Embodiments of a GFCI disclosed herein (e.g., GFCI 100, 200, 300) can be used for any suitable application (e.g., outlets, circuit breakers). In accordance with at least one aspect of this disclosure, a GFCI circuit breaker (not shown, e.g., a single pole, a double pole, or any other suitable circuit breaker type) can be similar to and/or include any suitable embodiment and/or portion of a GFCI 100, 200, 300 disclosed hereinabove. The GFCI circuit breaker can include a line wire 102 passing through the single core 105, 205, and a neutral wire 104 passing through the single core 105, 205, for example.

In accordance with at least one aspect of this disclosure, a method can include using at least two coils (e.g., a first winding 107 and a second winding 109, a GF sense winding 207 and a test winding 209, or the three windings 207, 209, and 323) on a single core 303 to provide simultaneous GF monitoring and GN monitoring. In certain embodiments, using the at least two coils can include sensing line-to-ground fault using a GF sense winding 207 and sensing neutral-to-ground fault using a test winding 209.

Figure 4A:
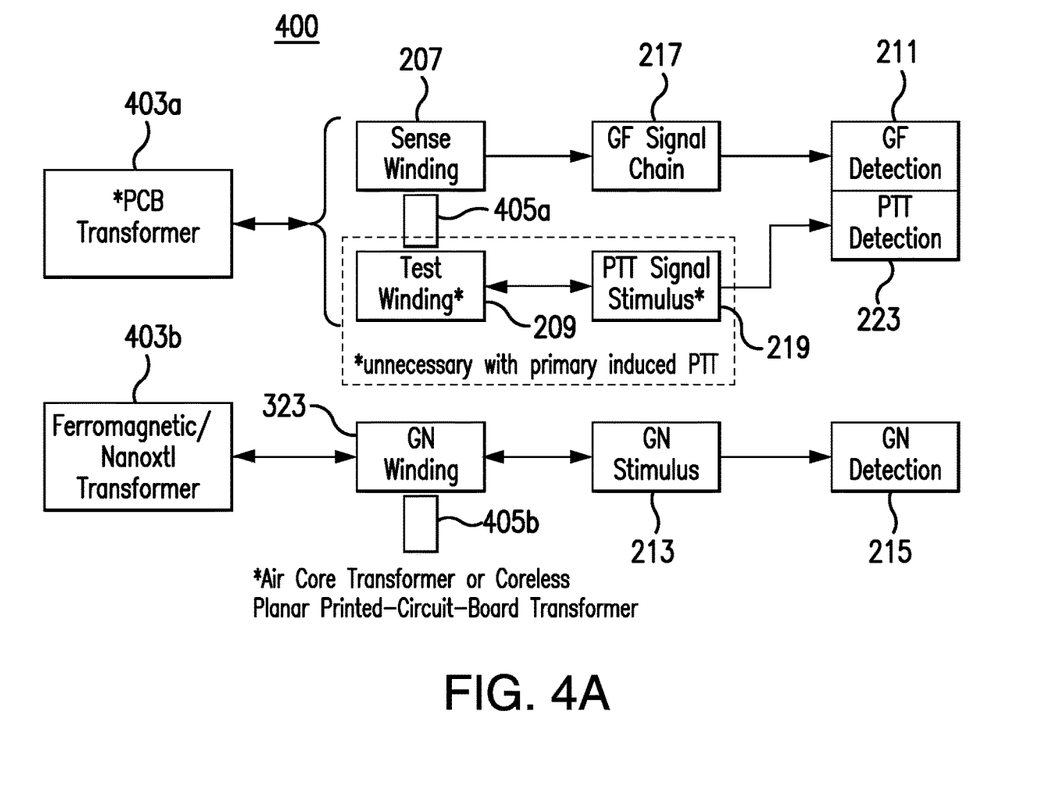
FIG. 4A is a schematic diagram of an embodiment of a GFCI in accordance with this disclosure.
Figure 4B:
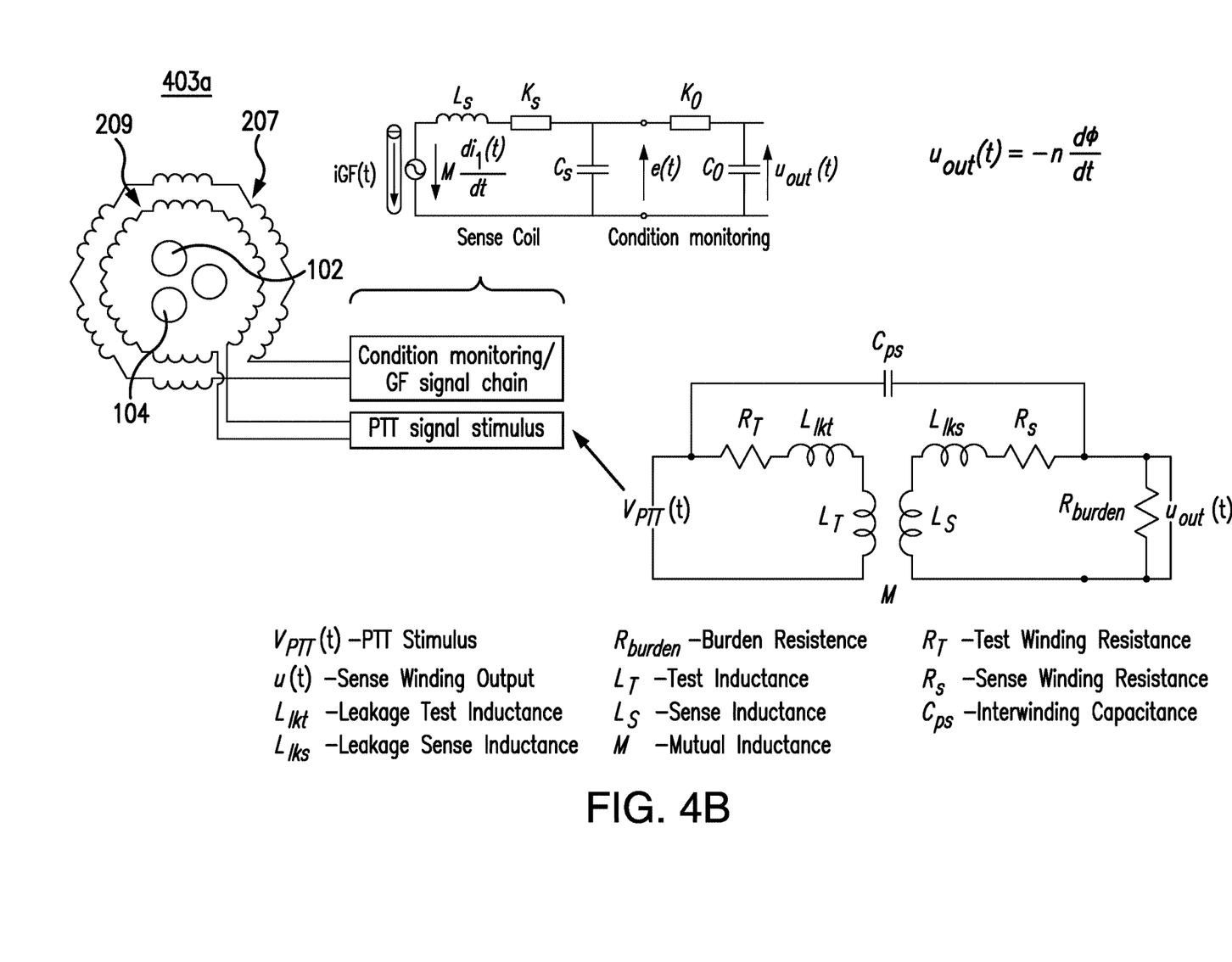
FIG. 4B is a schematic diagram of an embodiment of a portion of the GFCI of FIG. 4A, showing example circuit representations.
Figure 4C:
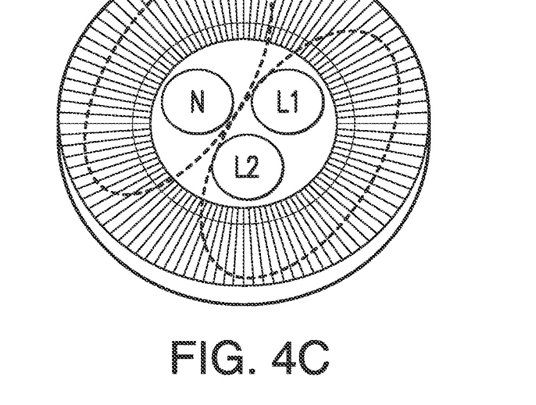
FIG. 4C is a schematic diagram showing an embodiment of a PCB and/or air core circuit transformer.

In accordance with at least one aspect of this disclosure, referring to FIGS. 4A and 4B, a GFCI 400 can include a first current transformer CT 403a having a first core 405a. The first core 405a can be a PCB core or an air core (e.g., as shown in FIG. 4C). The GFCI 400 can include a GF sense winding 207 (e.g., similar the windings 107, 207 described above) wound around the first core 405a (e.g., around the entire circumference).

The GFCI 400 can include a second CT 403b having a second core 405b (separate from the first core 403a). The second core 405b can be a ferromagnetic or nanocrystalline core. The GFCI 400 can include a GN sense winding wound around (e.g., partially) the second core. The GFCI can include a GF detection module 211 (e.g., as described above) operatively connected to the GF sense winding 207 to receive signals from the GF sense winding 207 and configured to determine whether a line-to-ground fault exists. The GFCI 400 can include a GN detection module 215 (e.g., as described above) operatively connected to the GN sense winding 323 and configured to receive signals from the GN sense winding 323 to determine whether a neutral-to-ground fault exists.

In certain embodiments, the first current transformer 403a can include a test winding 209 (e.g., as described above) wrapped around the first core 403a (e.g., coiled around, or planar coiled). In certain embodiments, the GFCI 400 includes a test signal stimulus 219 (e.g., as described above) operatively connected to the test winding 209 to supply a test signal to the test winding 209 when activated such that the test signal is coupled onto the GF sense winding via the CT and detected by the GF detection module which receives the signal from the GF sense winding to determine if the CT and GF signal chain is operating correctly.

In certain embodiments, the GN sense winding 323 is a wound around the second core 20 times (e.g., only along a portion of the circumference, e.g., less than a third of the circumference). In certain embodiments, the GF sense winding is wound around the entire circumference of the first core. In certain embodiments, the GN stimulus 213 is configured to allow the GN detection module 215 to sense changes in impedance to determine whether a neutral-to-ground fault exists (e.g., as described above). In certain embodiments, the GF detection module 211 and the GN detection module 223 operate simultaneously and/or continuously (e.g., as described above).

Figure 4D:
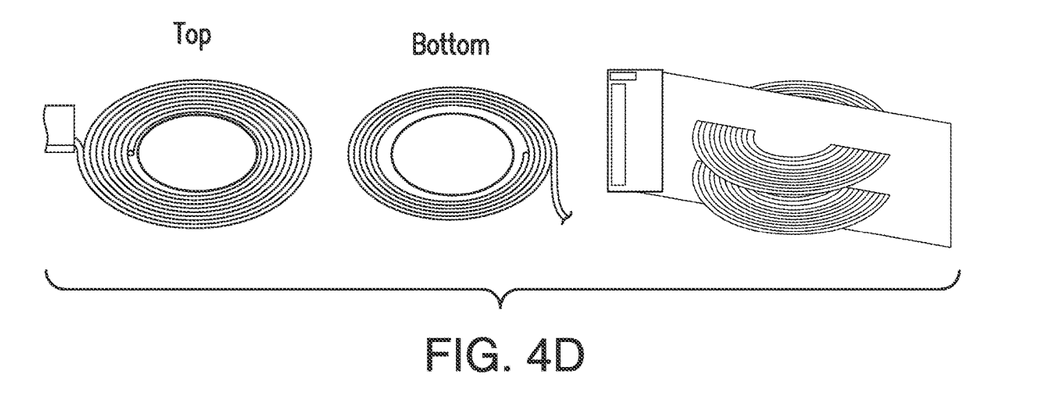
FIG. 4D is a schematic diagram of an embodiment of a planar coreless PCB GF sense winding.

In certain embodiments, the first CT 403a can have a coreless planar PCB GF sense winding (e.g., as shown in FIG. 4D) instead of having a core 405a and a winding wound around the core 405a. Any suitable number of planar wounds is contemplated herein.

Figure 5A:
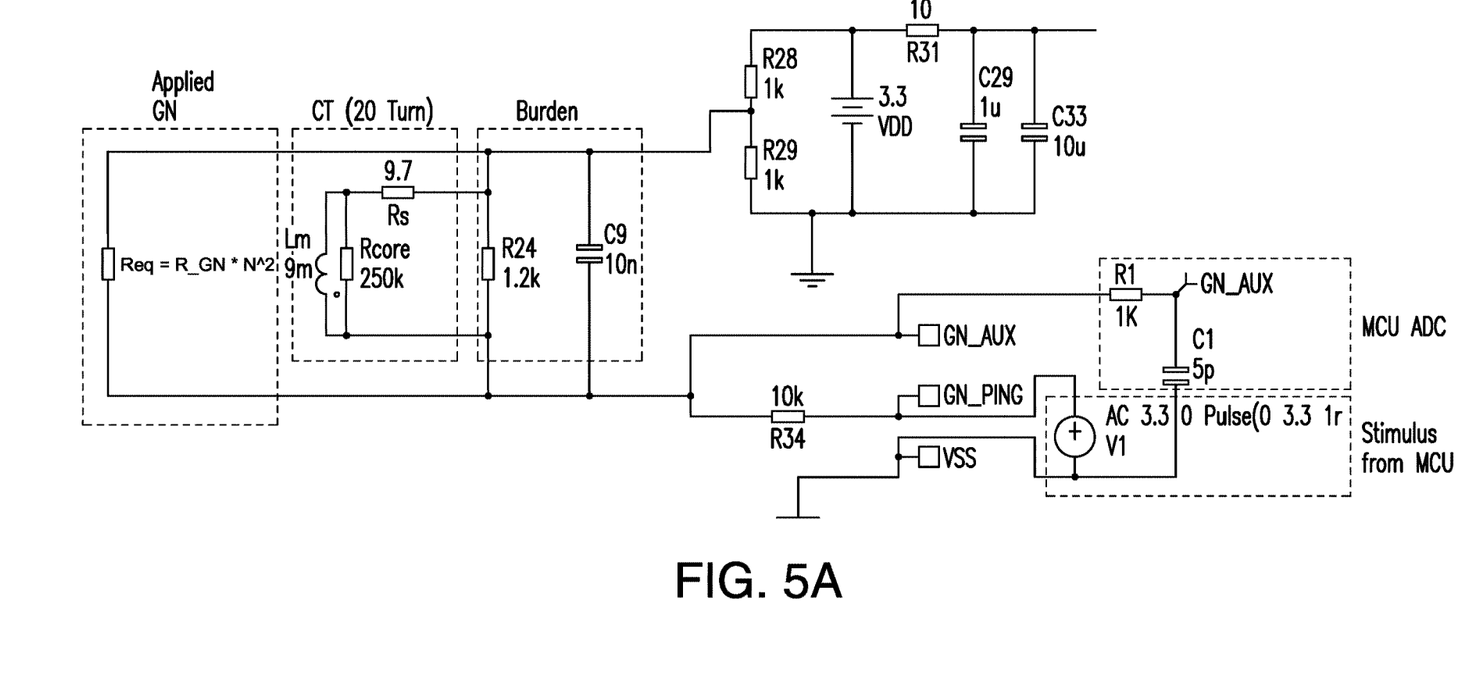
FIGS. 5A and 5B show a schematic diagram of a simulation of one or more embodiments of this disclosure.
Figure 5B:
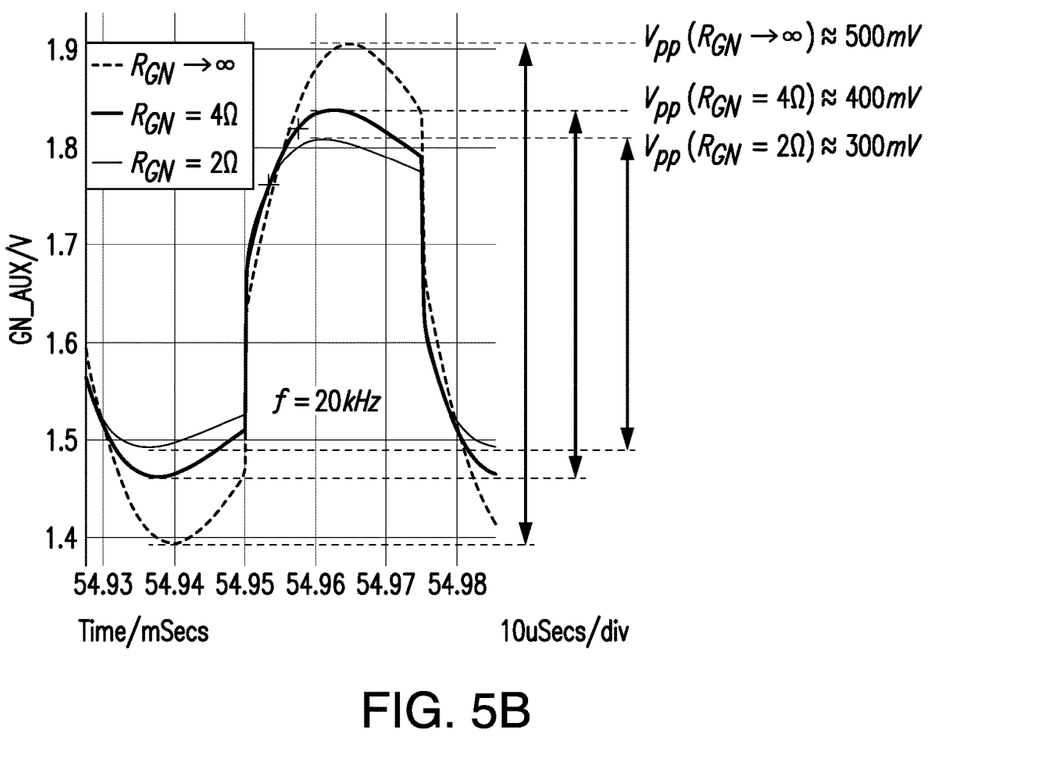

FIGS. 5A and 5B show a schematic diagram of a simulation of one or more embodiments of this disclosure. FIG. 5A shows a simulation circuit diagram, and FIG. 5B shows charged results. As shown, with a 20 turn test winding, enough of a change can be seen to detect a GN fault. A 2Ω GN fault is detectable due to about 200 mVpp difference in response compared to when GN fault is absent. This shows a 20 turn test winding works when tested in isolation (e.g., as in the embodiment of FIG. 4A).

In accordance with at least one aspect of this disclosure, a GFCI circuit breaker (not shown) can include a first CT 403a and a second CT 403b as disclosed hereinabove. The GFCI circuit breaker can include a line wire 102 passing through both of the first core 405a and second core 405b, or both of the coreless GF sense winding 207 and the second core 209. The GFCI circuit breaker can include a neutral wire 104 passing through both of the first core 405a and second core 405b, or both of the coreless GF sense winding 207 and the second core 405b. The GFCI circuit breaker can be similar to and/or include any suitable embodiment and/or portion of a GFCI disclosed hereinabove.

In accordance with at least one aspect of this disclosure, a GFCI (e.g., GFCI 100, 200, 300, 400) can include a CT arrangement (e.g., a single CT 103, 203, 303, or a plurality of CTs 403a, 403b as disclosed above) having or more cores (e.g., single core 105, 205, or cores 405a and 405b). The CT arrangement can include a GF sense winding (e.g., as described above) wound around one of the one or more cores, and a test winding (e.g., as described above) wound around one of the one or more cores. The GFCI can include a GF detection module (e.g., as described above) operatively connected to the GF sense winding to receive signals from the GF sense winding and configured to determine whether a line-to-ground fault exists. The GFCI can also include a test signal stimulus operatively connected to the test winding to supply a test signal to the test winding when activated such that the test signal is coupled onto the GF sense winding via the CT and detected by the GF detection module which receives the signal from the GF sense winding to determine if the CT and GF signal chain is op-erating correctly. The GFCI can include a GN detection module operatively connected to the test winding and configured to receive signals from the test winding to determine whether a neutral-to-ground fault exists. The GFCI can also include a GN stimulus operatively connected to the test winding to provide a GN stimulus signal to the test winding. The GFCI can include any other components, e.g., as disclosed hereinabove, and/or can be similar to other embodiments of GFCIs disclosed herein. Any suitable number of cores (e.g., one, more than one) are contemplated herein (e.g., such that the GFCI includes any suitable number of CTs, e.g., one, two).

In accordance with at least one aspect of this disclosure, a GFCI circuit breaker can be or include the GFCI as disclosed above. The GFCI circuit breaker can include a line wire 102 passing through the one or more cores, and a neutral wire 104 passing through the one or more cores.

In accordance with at least one aspect of this disclosure, a method can include using a GF sense winding to provide GF monitoring to detect a line-to-ground fault, and using a test coil for testing GF monitoring function and to provide GN monitoring to detect a neutral-to-ground fault. In certain embodiments, GN monitoring and GF monitoring are simultaneous. The GFCI circuit breaker can be similar to and/or include any suitable embodiment and/or portion of a GFCI disclosed hereinabove (e.g., GFCI 100, 200, 300, 400).

In accordance with at least one aspect of this disclosure, a ground fault circuit interrupter (GFCI) can include a current transformer (CT) having a single core, a first winding wound around the single core, and a test winding wound around the single core. The GFCI can include a ground fault (GF) detection module operatively connected to the first winding to receive signals from the first winding and configured to determine whether a line-to-ground fault exists, a grounded neutral (GN) detection module operatively connected to the first winding and configured to receive signals from the first winding to determine whether a neutral-to-ground fault exists, and a FET configured to switch between a GF sense mode and a GN sense mode, and a push-to-test module operatively connected to the test winding to inject test signal onto the single core.

Figure 6:
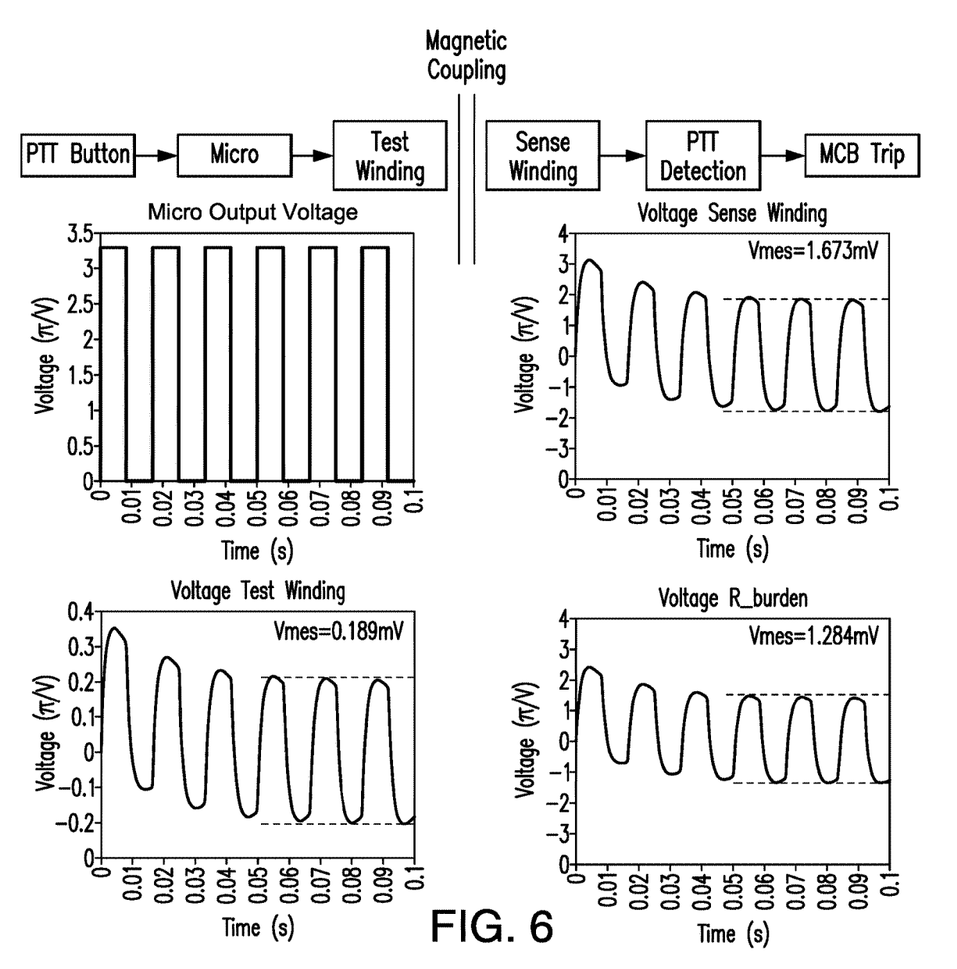
FIG. 6 shows an embodiment of a test control scheme in accordance with this disclosure.

FIG. 6 shows an embodiment of a test control scheme in accordance with this disclosure. In accordance with at least one aspect of this disclosure, referring to FIG. 6, for example, a method can include using a controller (e.g., a microprocessor, a microcontroller, or any other suitable logic device) to inject a controller signal onto a test winding, receiving the controller signal from a sense winding magnetically coupled to the testing winding via a common core, and detecting the presence of the test signal at a test detection module. The controller can be activated by a push-to-test (PTT) button. The controller signal can have preset characteristics configured to be identified by the test detection module. The controller signal can be a square wave signal or any other waveform generated with a digital analog converter of the controller and/or any other analog circuitry associated therewith. Embodiments of a method can enable use of a capacitive touch PTT button instead of using a traditional momentary switch PTT button. Traditional momentary switch PTT buttons are used to close a physical circuit and send a half-wave rectified 50 Hz or 60 Hz signal that can only be detected during a shorter window (e.g., 30% of time). Embodiments can allow the injected stimulus signal to be of any arbitrary shape or frequency to avoid constructive/destructive interference with the coupling of existing leakage current onto the GF sense winding to better prevent false-negatives and false-positives in both GF detection and PTT failure-mode detection during the PTT process.

Embodiments can also allow a pushbutton on the breaker to be utilized for status and/or history checking without creating a GF leakage. For example, the controller can detect a length and/or pattern of the PTT button/signal and determine whether to send the test signal or take another action (e.g., provide a status and/or history checking with a short press). Any other suitable logic for button function is contemplated herein. Embodiments can allow PTT detection 100% of the injection time because the controller can control the signal type, characteristics, and/or when the signal starts and stops, for example.

In accordance with this disclosure, certain embodiments can enable detecting grounded neutral faults using a second winding on a ground fault sensor. Certain embodiments can utilize a separate analog signal chain to detect grounded neutral faults using an additional winding added to the existing ground faults current transformer. By separating the two signal chains, this deviates from current systems. Embodiments can enable minimal part count increase.

Existing systems having ground fault and grounded neutral detection circuitry utilize the same analog signal chain. Switching between the two states (GF sensing and GN sensing) in combination with a set of field conditions makes for the potential to have breakers unnecessarily trip in the field. By separating the functions into two distinct signal chains, field performance and the stability of the devices can be improved without adding additional cost.

Embodiments of a grounded neutral detection architecture can include a new hardware design, frequency range change, and various firmware algorithm changes compared to traditional systems. Embodiments can provide separate GF and GN signal chains for more robust GF and GN detection using multiple windings. Embodiments eliminate the field effect transistor (FET) and enable sampling of GN signals and GF signals at the same time.

Embodiments include alternative methods to separate GF and GN signal chains. For example, certain embodiments include two or more windings on a shared core. Embodiments can reduce nuisance tripping with more robust detection, provide simultaneous sampling on separate ADC channels for GF and GN, eliminates distortion from burden FET switching giving more accurate data, and can extend GF trip times up to 1486% with an estimate of GN level (e.g., 40 mA GF trip time increases from 25 ms up to 371 ms). Such embodiments can use that same PCBA footprint with only a slight increase in overall BOM cost.

In certain embodiments, GF and GN sensing can have entirely separate lanes. For example, the GF sensing can use and air core (e.g., a coreless planar printed-circuit-board transformer) CT and the GN sensing can use a ferrite or nanocrystalline core CT. Such embodiments can include the same advantages as described above for single core embodiments, and also prevent the GF CT saturation during large magnitude faults which allows GF detection module to have detection logic that is more robust against nuisance tripping. Embodiments can also utilize 20 turns or less (e.g., 1 turn, 5 turns, 10 turns, etc.) on the GN CT which can be cheaper than currently used components to offset the cost of adding an air-core/PCB coil.

All embodiments can utilize a push-to-test system. All embodiments can be compatible with primary and/or secondary injection architectures.

As disclosed above, certain embodiments can include two windings on shared core. The core is configured to be magnetically connected to the line conductor and the neutral conductor such that the line and neutral conductors can induces current in the windings proportional to the current in the core. Each winding can be enamel coated copper wires. In embodiments, the ground fault module can be configured to open the contactors if a detected fault is large enough for a long enough time. Certain embodiments can be configured to account for interference from other windings on a common core. GF test signals can have a distinct signal/waveform to make it easier to filter out of the background noise. Embodiments can combine the test winding and the GN sense winding into one CT. Certain embodiments can combine the GN stimulus hardware and the GF test stimulus hardware (e.g., the same microchip can be configured to send different kinds of signals out to do both functions). In certain embodiments, the commonly hosted test functions may have to be done at different times. In certain embodiments, both can be done at the same time.

Embodiments of the GN detection module can be configured to sense impedance changes by changing the GN stimulus signal. For example, the GN detection module can include a microcontroller that injects a high or low excitation signal back and forth to the winding and into the core.

Certain embodiments can include three windings on shared core. In such embodiments, the GN functions can be decoupled from the test functions. This can be a way to separate every function and have it operate independently. In this case, there may be more pins because there are separate pathways, more windings, and additional hardware. However, each pathway is able to be tuned to the best operation for that pathway. For example, the purpose of test winding is to inject test signals onto the GF signal chain to see if everything is working properly, whereas GN detection signals on the GF chain are not necessarily desirable. In certain embodiments, GN signals should be detectable but ignorable. Being able to tune each signal change separately can allow desired tuning of GN stimulus signals and PTT test signals, for example.

Certain embodiments can include entirely separate GF CT and GN CT to separate the pathways further. Such embodiments have two current transformers. In certain embodiments, the GF side can have a PCB transformer with two windings (e.g., sense and test), and the GN side can have a ferromagnetic core (e.g., ferrite or monocrystalline). The traces in the PCB can form the windings for example. This works because weaker signals for GF test signals are acceptable, but the GN detection can require stronger signals to function.

Embodiments can include any suitable signal conditioning components. Automonitoring requirements of UL943 can be satisfied by either primary current injection or secondary coupling, and both are compatible with each embodiment, for example.

Embodiments can include up to three windings, one for GF, one for GN, and one for an automonitor (e.g., GF test stimulus) on a shared core. Embodiments can include up to two windings on an air-core (i.e., coreless) CT, one for GF and one for the automonitor. Embodiments allow for simultaneous data sampling of GF and GN, use of an air-core transformer or coreless planar PCB transformer for GF, and secondary coupling signal injection for the automonitor.

Embodiments can include multiple windings on a shared core that separates GF and GN signals to reduce interference and increase robustness while minimizing both BOM cost and PCB footprint/real-estate. Embodiments allow simultaneous data sampling of GF and GN signals. Embodiments can further extend required trip times of GFCI in the case where a GN condition is weak or absent (e.g., up to 1486% in the case of where a GN condition is absent), thereby reducing risk of nuisance tripping. Simultaneous data sampling nearly doubles the amount of data used in the portions of the GF testing which require the fastest trip times by eliminating the need for GN detection to interrupt. Simultaneous data sampling also allows GN detection to occur continuously instead of for only 5 ms at 300 ms intervals, thus increasing robustness of GN detection and reducing risk of nuisance tripping on high-frequency leakage current noise.

Embodiments can include any suitable computer hardware and/or software module(s) to perform any suitable function (e.g., as disclosed herein). Any suitable module and/or stimulus disclosed herein can include any suitable hardware and/or software module(s).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A ground fault circuit interrupter (GFCI), comprising:
   a current transformer (CT) comprising:
      a single core;
      a ground fault (GF) sense winding wound around the single core; and
      a test winding wound around the single core;
   a GF detection module operatively connected to the GF sense winding to receive signals from the GF sense winding and configured to determine whether a line-to-ground fault exists;
   a test signal stimulus operatively connected to the test winding to supply a test signal to the test winding when activated such that the test signal is coupled onto the GF sense winding via the CT and detected by the GF detection module which receives the signal from the GF sense winding to determine if the CT and a GF signal chain is operating correctly; and
   a grounded neutral (GN) detection module operatively connected to at least one winding of the CT and configured to receive signals from the at least one winding to determine whether a neutral-to-ground fault exists, wherein the at least one winding of the CT that is operatively connected to the GN detection module is the test winding such that the GN detection module is configured to receive signals from the test winding to determine whether the neutral-to-ground fault exists.

2. The GFCI of claim 1, further comprising a GN stimulus operatively connected to the test winding to provide a GN stimulus signal to the test winding.

3. The GFCI of claim 2, wherein the GN stimulus is configured to allow the GN detection module to sense changes in impedance to determine whether the neutral-to-ground fault exists.

4. The GFCI of claim 3, wherein the test signal stimulus and the GN stimulus are commonly hosted on a single module of hardware and/or software.

5. The GFCI of claim 1, wherein the GF detection module and the GN detection module are configured to operate simultaneously and/or continuously.

6. The GFCI of claim 1, further comprising a test detection module operatively connected to the GF sense winding to receive the test signal from the test signal stimulus to test the CT and/or the GF signal chain between the CT and the GF detection module.

7. The GFCI of claim 6, wherein the test detection module is configured to receive a test initiation signal associated with the test signal stimulus being activated.

8. The GFCI of claim 7, wherein the GF detection module and the test detection module are commonly hosted on a single module of hardware and/or software.

9. A ground fault circuit interrupter (GFCI) circuit breaker, comprising:
  a current transformer (CT) comprising:
    a single core;
    a ground fault (GF) sense winding wound around the single core; and
    a test winding wound around the single core;
  a line wire passing through the single core;
  a neutral wire passing through the single core;
  a GF detection module operatively connected to the GF sense winding to receive signals from the GF sense winding and configured to determine whether a line-to-ground fault exists;
  a test signal stimulus operatively connected to the test winding to supply a test signal to the test winding when activated such that the test signal is coupled onto the GF sense winding via the CT and detected by the GF detection module which receives the signal from the GF sense winding to determine if the CT and GF signal chain is operating correctly;
  a grounded neutral (GN) detection module operatively connected to at least one winding and configured to receive signals from the at least one winding to determine whether a neutral-to-ground fault exists, wherein the CT includes a GN sense winding, wherein the at least one winding of the CT that is operatively connected to the GN detection module is the GN sense winding.

10. The GFCI circuit breaker of claim 9, wherein the test signal stimulus and the GN stimulus are commonly hosted on a single module of hardware and/or software.

11. The GFCI circuit breaker of claim 9, wherein the GF detection module and the GN detection module are configured to operate simultaneously and/or continuously.

12. The GFCI circuit breaker of claim 9, wherein the GF detection module and a test detection module are commonly hosted on a single module of hardware and/or software.

13. A method, comprising:
  using at least two coils on a single core to provide simultaneous ground fault (GF) monitoring and grounded neutral (GN) monitoring; and
  supplying a test signal to a test winding wound around the single core with a test stimulus, wherein GN monitoring includes providing a GN stimulus signal from a GN stimulus to the test winding, and wherein the test stimulus and the GN stimulus are commonly hosted on a single module of hardware and/or software.

14. The method of claim 13, wherein using the at least two coils includes sensing a line-to-ground fault using a GF sense winding and sensing a neutral-to-ground fault using the test winding.

15. A ground fault circuit interrupter (GFCI), comprising:
  a current transformer (CT) comprising:
    a single core;
    a first winding wound around the single core; and
    a second winding wound around the single core;
  a ground fault (GF) detection module operatively connected to the first winding to receive signals from the first winding and configured to determine whether a line-to-ground fault exists;
  a GN stimulus operatively connected to the second winding to provide a GN stimulus signal to the second winding; and
  a grounded neutral (GN) detection module operatively connected to the second winding and configured to receive signals from the second winding to determine whether a neutral-to-ground fault exists.

16. The GFCI of claim 15, further comprising a GF test signal stimulus operatively connected to the second winding to supply a test signal to the second winding when activated such that the test signal is received by the first winding.

* * * * *